United States Patent
Domsch et al.

(10) Patent No.: US 8,868,877 B2
(45) Date of Patent: Oct. 21, 2014

(54) CREATING ENCRYPTED STORAGE VOLUMES BASED ON THIN-PROVISIONING MODE INFORMATION

(75) Inventors: Matthew L. Domsch, Austin, TX (US); Lazarus J. Vekiarides, West Roxbury, MA (US)

(73) Assignee: Dell Products, LP, Round Rock, TX (US)

( * ) Notice: Subject to any disclaimer, the term of this patent is extended or adjusted under 35 U.S.C. 154(b) by 283 days.

(21) Appl. No.: 13/444,041

(22) Filed: Apr. 11, 2012

(65) Prior Publication Data

US 2013/0275671 A1    Oct. 17, 2013

(51) Int. Cl.
*G06F 12/00* (2006.01)

(52) U.S. Cl.
USPC .......................................... 711/170; 711/154

(58) Field of Classification Search
USPC ........................................................ 711/170
See application file for complete search history.

(56) References Cited

U.S. PATENT DOCUMENTS

| | | | |
|---|---|---|---|
| 6,990,573 B2 | 1/2006 | Cherian et al. | |
| 8,656,096 B2 * | 2/2014 | Acedo et al. | 711/112 |
| 2009/0144496 A1 | 6/2009 | Kawaguchi | |
| 2010/0115223 A1 | 5/2010 | Sakaguchi | |
| 2010/0146039 A1 | 6/2010 | Lo et al. | |
| 2010/0180107 A1 | 7/2010 | Chaganti | |
| 2010/0262802 A1 | 10/2010 | Goebel et al. | |

FOREIGN PATENT DOCUMENTS

EP    1 814 033 A2    8/2007
WO    WO 2010/113207 A1    10/2010

OTHER PUBLICATIONS

Notification of Transmittal of the International Search Report and the Written Opinion of the International Searching Authority for Int'l Application No. PCT/US2013/033235; entitled: "Creating Encrypted Storage Volumes," Date Mailed: Jul. 1, 2013.
Williams, Jim: "Oracle Automatic Storage Management and Thin Reclamation," Mar. 31, 2010, pp. 1-11, Retrieved from the internet: URL:http://www.oracle.com/technetwork/database/oracle-automatic-storage-management-1-32797.pdf; Retrieved on: Jun. 21, 2013.
Basile, A.G., "Randon versus Encrypted Data," *Creative Commons Attribution-Share Alike 3.0 License* (2008).
http://searchstoragechannel.techtarget.com/feature/Thin-provisioning?vgnextfmt=print, downloaded on Aug. 2, 2011.
"Dell | EMC CX4 Virtual Provisioning Overview," Copyright © Dell Inc. (Aug. 2008).

* cited by examiner

*Primary Examiner* — John Lane
(74) *Attorney, Agent, or Firm* — Hamilton, Brook, Smith & Reynolds, P.C.

(57) ABSTRACT

Methods and systems for thin provisioned storage. A storage array controller may materialize LUN extents, by filling extents with random data only as necessary at materialization time. Encryption software may recognize operation on a thin provisioned LUN having extents that are pre-filled and/or re-materialized on next use.

18 Claims, 5 Drawing Sheets

STORAGE ARRAY
PROCESSES

*FIG. 4A*

FIG. 4B

CREATING ENCRYPTED STORAGE VOLUMES BASED ON THIN-PROVISIONING MODE INFORMATION

BACKGROUND

The present disclosure relates generally to information handling systems and more particularly to techniques that avoid physical materialization of storage areas while decreasing the time to set up thin provisioned storage resources with encrypted data.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may implement a storage management system. The storage management system may have a file system manager that presents a logical view of the storage system to a user, and a physical layer manager that manages the actual physical storage devices. When a block of data is freed at the logical layer, the file system manager may then identify the freed block and send a command to the physical layer manager. The physical layer may identify the corresponding physical block or blocks and free those blocks on the physical storage devices. The storage management system may use a table to manage the location of blocks of data across multiple physical storage devices.

All end-user applications require storage to operate. With traditional storage management, a logical unit number (LUN) is created and assigned to each enterprise application—a process called "provisioning." Creating a LUN (similar in principle to creating a partition on a computer's hard drive) basically carves out some portion of empty physical space in a storage array, which is then formally assigned to the particular application. The application runs over time, gradually filling the storage space allocated for the LUN.

An LUN or "Logical Unit Number" is an identifier assigned to a "logical disk." A "Closed Logical Disk" is an area of useable storage located on one or more physical storage devices. A logical disk can be located on one or more physical storage devices. A logical disk can be further partitioned, to provide logical volumes, virtual disks and other "chunks."

But traditionally provisioned applications face several problems. Traditional LUNs cannot grow easily, and applications that run out of space will suffer performance problems or even crash outright until the LUN is resized. Expanding a traditional LUN requires the application to be quiesced and taken offline while the original LUN is backed up. Then the old LUN is deleted and a new larger one is created to provide additional storage space. The original LUN contents are restored to the new LUN, and the application can be restarted.

This time-consuming and error-prone process encourages excessive LUN sizes up front to avoid the need to resize for months or years. At the same time, that big LUN serves only one application. Ultimately, traditional provisioning results in poor storage utilization and wastes money, since customers wind up buying substantially more storage to set aside in large, empty LUNs—storage professionals often dub this "fat provisioning."

Traditional storage management can introduce a lot of waste. Users may leave anywhere from 30% to 50% of their allocated space unused. This is hardly trivial—for every 10 Tera Bytes (TB) purchased, 3 to 5 TB are left unused because of inefficient provisioning. This practice not only wastes the capital spent to acquire the disks and storage arrays, but also means additional expenditures for more disks and systems to keep the business running, because customers cannot access their stranded storage.

So-called "thin-provisioning" overcomes these problems, improving storage utilization and saving money. Thin provisioning is a technique by which logical resources may be drawn from physical resources, and in which the logical resources may not be limited to the capacity of the physical resources. In storage technologies, a thin provisioned system may have several logical volumes that are provided by a storage system having a fixed capacity. Each thin provisioned volume may present itself as having the full amount of the storage system available, but the physical storage may only be partially allocated as requested by a respective volume.

Thin provisioning thus overcomes the waste of traditional provisioning schemes using a trick called "oversubscription" (sometimes called "over allocation"), in which a LUN, in essence, is created from a common pool of storage. The LUN is larger than the amount of physical storage that is actually available. For example, thin provisioning might allow a 1 TB LUN to be created, even though only 100 GB of physical storage are actually set aside. Thin provisioning also relies on automation to map LUNs and then create or resize volumes, reducing the management overhead typically needed for provisioning tasks.

If the application uses the LUN normally, then eventually the 100 GB of actual storage will fill up. As actual space runs short, more physical storage can be added to supply additional free space as actual utilization grows—the application (in our example) still "thinks" it has 1 TB, but the actual physical storage the storage array can be far less. The actual space grows without altering the LUN or disrupting the application, making thinly provisioned storage faster and easier to manage. This saves money since the customer buys more storage only as needed, and drives up the storage utilization because very little of the LUN's disk space is left empty.

SUMMARY

For quite some time software has been available on a variety of operating systems such as Microsoft Windows® and Linux® to encrypt data prior to writing it to a storage device. For example, Linux® LUKS and McAfee Input Encryption are but two examples and there are many others.

On a thin provisioned LUN such as can be exposed by a storage array controller, existing software ignores the fact that the disk is thin provisioned. Therefore existing software will proceed to write random data to an entire LUN which may be many gigabytes to terabytes in size prior to writing encrypted data to a LUN. This is a common approach in order to maximize the difficulty uncovering plain text from clear text. This causes the entire LUN to be materialized in the array, which negates the benefit of thin provisioning in the first place.

The operation of prefilling the entire disk with random data can take quite a long time and even several days for multi-terabyte LUNs. Other operations to the disk during this time must be put on hold until this operation completes.

During file system use, files should be created and deleted. Deleted file blocks may be zero filled by the file system to prevent acts of data disclosure on an un-encrypted disk. Through the use of standard TRIM or discard commands, block contents on thin provisioned LUN must be thrown away by the array controller; thereafter, if those blocks are read or partially written, an array may choose to return those blocks filled with zeros. This is also undesirable for an encrypted volume, because the presence of zero filled extents may be useful in determining the plain text data that is nearby to those extents.

In a preferred embodiment several novel features are added to a virtualized, thinly provisional storage system, solving a need to materialize an entire LUN while greatly decreasing the time to set up and beginning using a LUN with encrypted data. Furthermore, additional protection can be provided for the encrypted data.

In one aspect, an array controller for a storage array is provided with the ability to materialize extents that are filled only as necessary at materialization time with random data. The array controller has a high speed hardware random number generator that is employed to create the random data. Normally, newly materialized extents in a thinly provisioned array are filled with zeros. However, in the approach discussed herein, a configuration option is provided for each thin provisioned LUN to record data to indicate to the array the mode that it should use, e.g., either a zero filled mode or a random fill mode. This configuration mode is exposed by the array controller to higher level software running in a host.

In a second aspect, application software running on the host is altered to recognize when it is in the process of being asked to encrypt a thin provisioned LUN. This it may do by reading the iSCSI inquiry thin provisioning mode page, as well as to recognize when that LUN's extents are prefilled with random data (again by reading such a value from the mode page). The application level encryption software may then skip any prefilling of the entire disk with random data. In doing so, much time is saved when an initial LUN is provisioned.

According to yet another aspect, it is now possible for the application and later encryption software to recognize when it is operating on a thin provisioned LUN. In particular, after receiving a command to release storage blocks (e.g., the "TRIM" ATA level command, or the "UNMAP" SCSI level command), the encryption software can recognize when it is operating on a thin provisioned LUN having extents that are rematerialized with data on the next use, and then skip filling those blocks with zeros or random data itself.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

Figure 1:
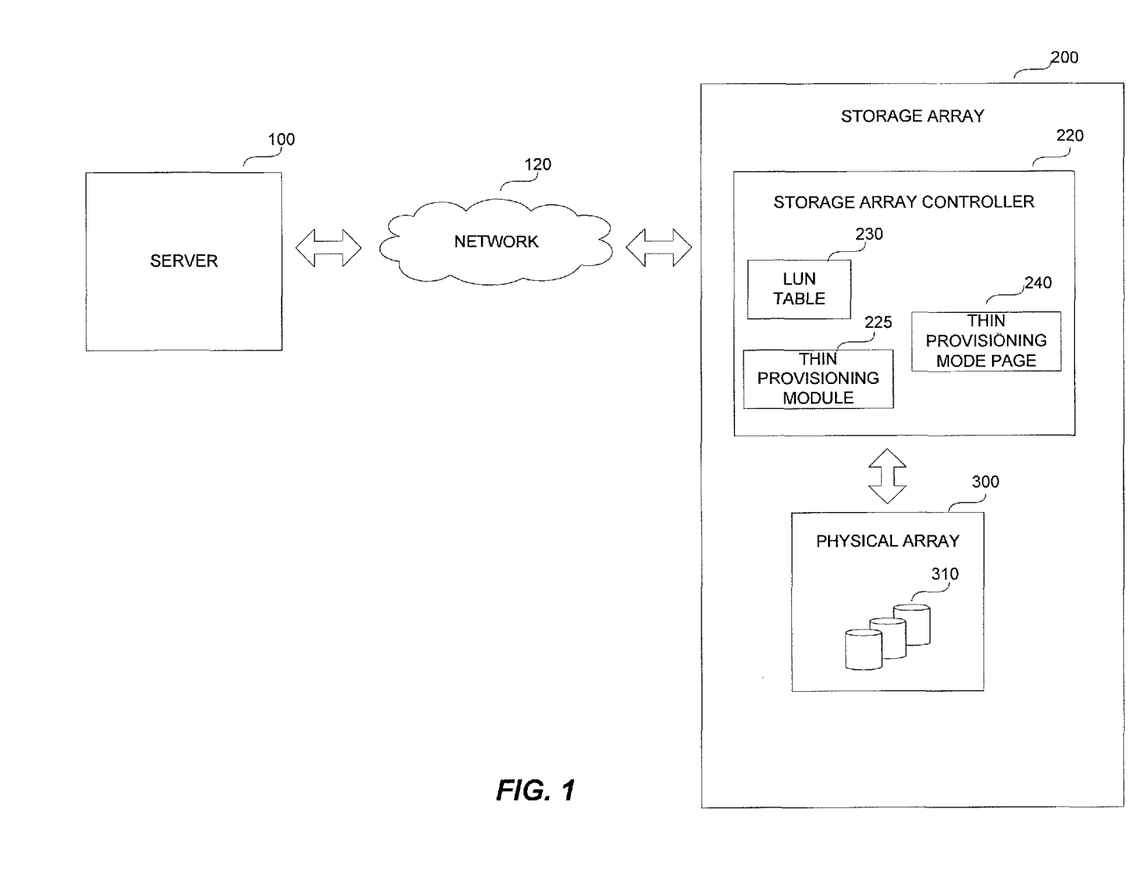
FIG. 1 is a high level diagram of an environment in which an information handling system may implement thin provisioned encrypted volumes according to one embodiment.

FIG. 1 is a high level diagram of an environment in which an information handling system may implement thin provisioned encrypted volumes according to one embodiment. As shown, the first information handling system 100 may operate as an application server, such as a database host, or other information handling system. The server 100 typically implements an application that requires at one point encryption software. The server 100 accesses, through some interface or network 120, a storage array 200 that provides access to a large number of physical storage volumes 310 forming a physical array 300. The interconnect 120 between server 100 and array 200 may be any sort of suitable connection but often times is a local or wide area network connection such as using a TCP/IP protocol and implementing storage network commands such as iSCSI. It should be understood, however that other types of interconnects 120 may be provided to use other protocols such as Fiber Channel and other suitable storage protocols.

One example embodiment relates to a storage array controller 220 comprising a host interface to a host processor, a storage array interface to a physical array, and a thin-provisioning module. The thin-provisioning module receives a command over the host interface that specifies an extent to be thinly provisioned in the storage array, and sets thin-provisioning mode information for the extent indicating that the extent should be filled with a specific data type.

Figure 2:
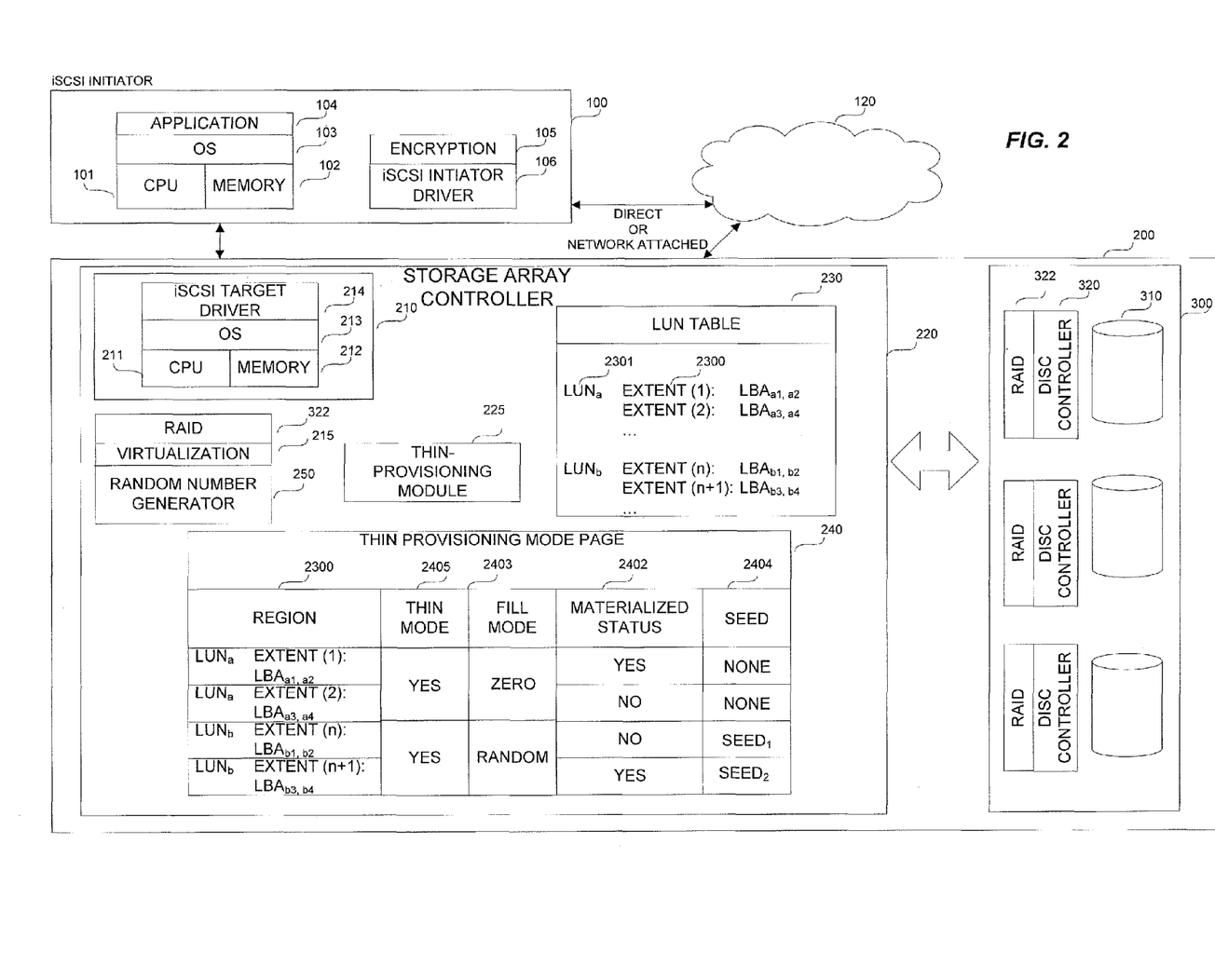
FIG. 2 illustrates a host and a storage array controller in more detail.

As shown in FIG. 1 and FIG. 2 storage array 200 includes a storage controller 220. According to one aspect, the storage array controller 220 consults a logical unit number (LUN) table 230 to map logical storage system references presented to the server 100 to the physical address schemes used on the physical storage volumes 310. Also, as part of a storage controller 220 and in accordance with the teachings here, there is a thin provisioning module 225 and a thin provisioning mode page 240 that is used by both the storage array controller 220 and server 100 in order to implement thin provisioning of volumes as described herein. According to another aspect, the contents of the thin provisioning mode page comprises a portion of the information provided in response to the INQUIRY command.

Turning attention to FIG. 2, host and storage array controller are shown in more detail. Server 100 as explained above is an information handling system having multiple functional elements. These include a data processor, such as a central processing unit 101, local memory 102 and other hardware typical of servers 100. Conceptually on top of that is a operating system 103, upon which runs an application program 104. The OS 103 and application 104 further make use of other functions such as encryption software 105 and storage device drivers such as an iSCSI intiator 106. iSCSI (Internet Small Computer System Interface), is an Internet Protocol (IP) based storage networking standard for linking data storage facilities. iSCSI commands are used by the server 100 to facilitate data transfer over networks and to allow for management of the storage array 200 over long distances. The iSCSI allows the host 100 (which in the parlance of the iSCSI standard are called initiators) to send SCSI commands to SCSI compatible storage devices (called the iSCSI targets) such as the physical array 300 in a remote location. It should be understood however other implementations may use other storage area network (SAN) protocols that are suitable for providing application 104 with the illusion of the remote physical array 300 to actually being locally attached.

Also, shown in more detail are elements of the storage array controller 220. Storage array controller 220 also includes its own information handling system 210 that has a central processing unit 211, memory 212, its own embedded operating system 213, and iSCSI target driver 214. The additional extraction of functions provided by storage array controller 220 may include storage virtualization 215.

The present implementation provides two important features. According to one aspect, the storage array controller further comprises a randomization module. The randomization module may be implemented in software, hardware, a combination thereof, or by any other suitable way. According to another aspect, the randomization module is a hardware random number generator. The storage array controller, either via the information handling system 210 and/or specialized hardware components, thus includes a random number generator 250 and a thin provisioning module 225.

The thin-provisioning module 225 may receive a command over the host interface that specifies an extent to be thinly provisioned in the physical array and to set thin-provisioning mode information for the extent indicating that the extent should be filled with a specific data type. According to one aspect, the specific data type specifies random numbers or zero fill.

In the process of carrying out iSCSI commands in a storage array 200, the storage array controller 220 accesses a LUN table 230 to locate specific target areas on the physical array 300. For example, there may be a number of LUNs defined each of which includes one or more extents 2300. The extents 2300 further define logical block address ranges that correspond to locations in the physical array 300. The physical block address ranges correspond to physical locations in the physical storage volumes 310. In this manner, application software running on the server 100 may reference areas in the physical array by LUN region identifier 2301, and need not be concerned with the details of extents or logical block address (LBA) extractions.

Also, as shown, the physical array 300 includes a number of physical storage devices 310 and each have their own disk controller 320. It should be understood that there may be further extractions involved with address schemes such as RAID layer 322 implemented in either physical array 300 and/or managed by storage array controller 220.

Thin provisioning mode page 240 is another table maintained by a storage array controller 220. According to another aspect herein, the thin-provisioning module 225 uses the thin-provisioning mode page 240 to store the thin-provisioning mode information. Thin provisioning mode page 240 is also made accessible to the host 100. Thin provisioning mode page 240 maintains thin provisioning information including a number of attributes for specific LUNs and/or more particularly, extents, or regions 2300 in the physical array 300.

According to another aspect, the information stored in thin-provisioning mode page 240 further comprises, for each extent, one or more LBAs (Logical Block Addresses), whether or not the corresponding LUN is thinly provisioned 2405, whether the specific data type is zero or random 2403, whether or not the extent is materialized 2402, and/or a random number seed 2404. For example, an extent may include a first attribute 2405 indicating whether or not its corresponding LUN may be thinly provisioned, a second attribute 2402 indicating whether that extent has been materialized, a third attribute 2403 indicating a specific data type by specifying a fill mode (e.g., as zero or random data), and other attributes that may include, but may not be limited to, a random number seed 2404.

Figure 3:
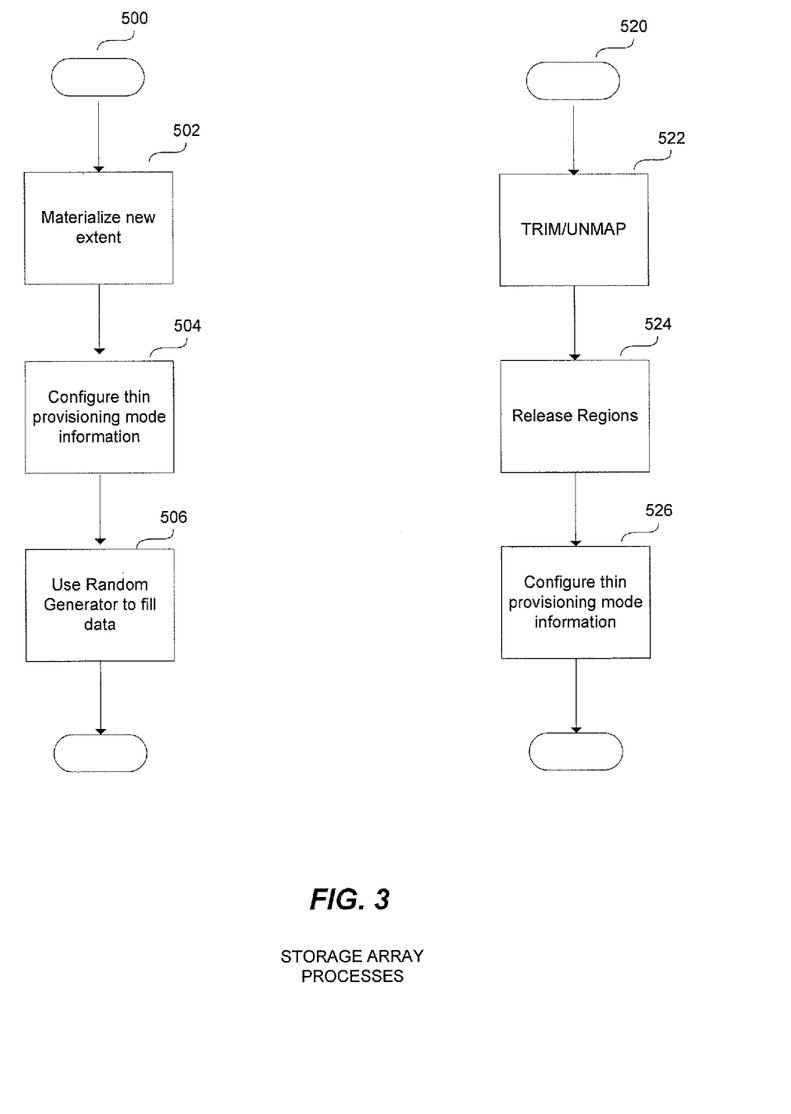
FIG. 3 is a flow diagram of certain processes carried out in the storage array controller.

FIG. 3 is a flow diagram of certain processes carried out in the storage array controller 220, and specifically processor 210. For example, a first set of steps begins in a state 500 which may occur within read and write access routines. In the state 502 a request has been received from a host to materialize a new extent. At this point, in state 504 one or more appropriate attributes of the thin mode provisioning information as configured in the thin provisioning mode page 240 are read, depending upon the nature of the received request. For example, the materialize attribute 2402 will now note for the corresponding extent that the extent is materialized and the corresponding fill mode 2403 is set according to a specific data type specified in a write request command. Next, in the state 506 the storage array controller 220 materializes the extent as requested choosing zeros or more particularly a local random number generator 230 to generate random numbers to fill the extent with actual data.

In another state 520 a command such as a TRIM or UNMAP command may be received. From such a state 522 indicating that an extent should be released, state 524 is entered in which the affected LBA ranges associated with the extent are released, and thin provisioning mode information of the corresponding entry of the thin provisioning mode page is configured accordingly in state 526. For example, the materialization attribute 2402 is configured to indicate that the corresponding extent is no longer materialized and additionally there may be updates to the LUN table 230 as may be appropriate.

According to another aspect, upon a request from the host, the storage array controller may materialize an extent as specified by the corresponding thin-provisioning information. The host may use the thin-provisioning mode information to avoid further requests to fill the extent with the specific data type.

Figure 4A:
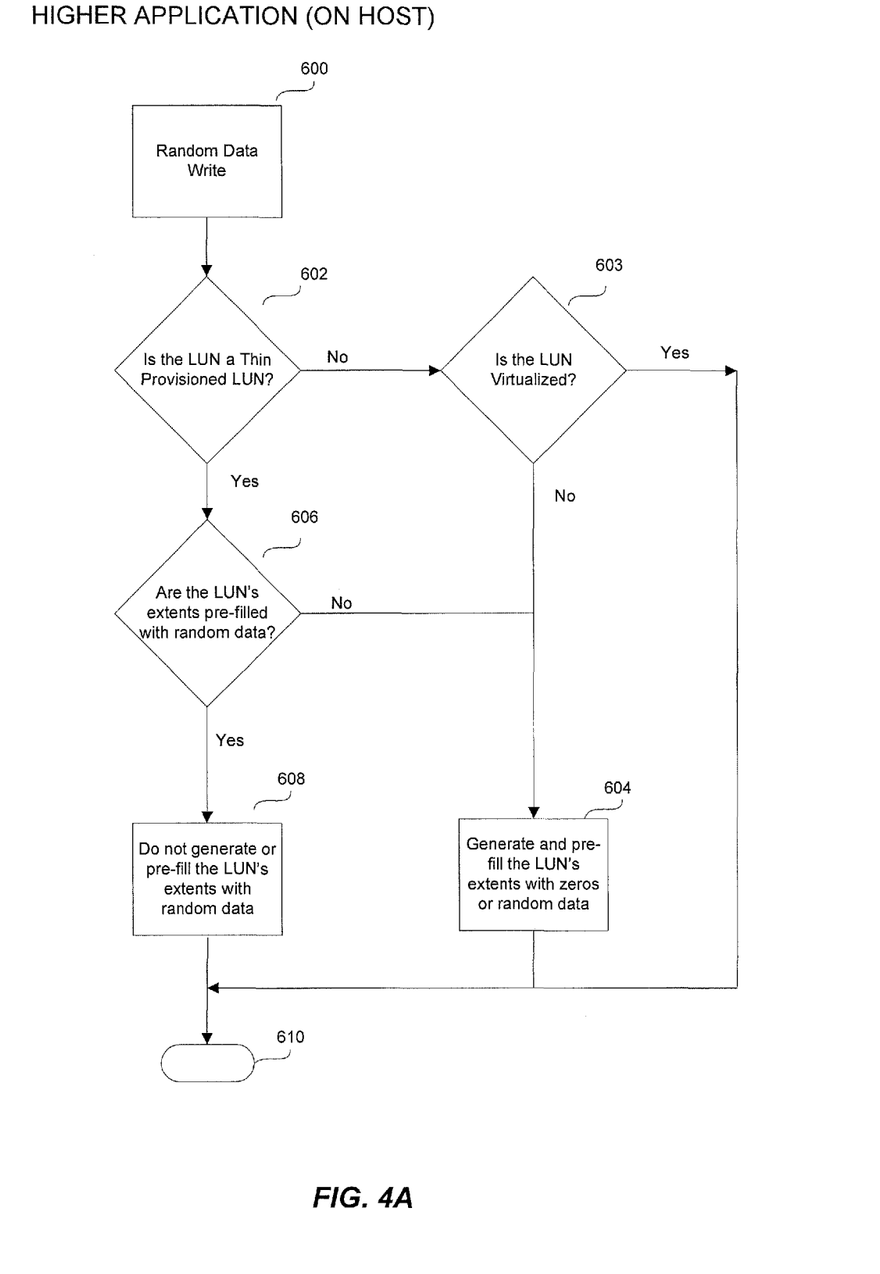
FIG. 4A illustrates a sequence of steps that may be carried out by a higher layer application on the host.

FIG. 4A illustrates a sequence of steps that may be carried out by the higher layer application 104 executing on the server 100. In the first state 600, a point may be reached where a request is being made by the application to write random data. From this point a state is entered 602 where the higher layer application checks if the thin provisioning feature is available. If the storage array controller 220 replies that the feature is not available then a state 603 is entered where the higher layer application checks if the LUN is virtualized. If the LUN is virtualized, the higher layer application is then free to enter a state 610 to perform other tasks and need not wait for the storage array controller to perform any further functions. According to one aspect, the storage array controller may ensure that random data is returned for read operations while performing background fill of the LUN extents with random data. According to another aspect, the storage array controller ensures that a background random data fill value committed to a location of the LUN matches the random data value returned by a corresponding read operation issued prior to a background commit to the location. However, if state 603 is entered and the LUN is not virtualized, then a state 604 is entered in which a higher array application itself will generate and write zeros or random data in the thin provisioned extent, and then the host is free to enter a state 610 to perform other tasks and need not wait for the storage array controller to perform any further functions.

If however, thin provisioning is available in state 602, then a state 606 is entered. Here, determination is made as to whether or not the extent is yet materialized with the specific data type. If the extent is already materialized, and the extents are pre-filled with random data, then a state 608 may be entered in which the higher layer application does not need generate and/or fill the LUN's extents with zeros or random data. At this point the higher layer application is then free to enter a state 610 to perform other tasks and need not wait for the storage array controller to perform any further functions.

If however, in state 606 the storage array controller 220 replies that the extents are not pre-filled, then state 604 is entered in which a higher array application itself will generate and write zeros or random data in the thin provisioned extent. A state 610 may then be entered in which the higher layer application is free to perform other tasks.

Figure 4B:
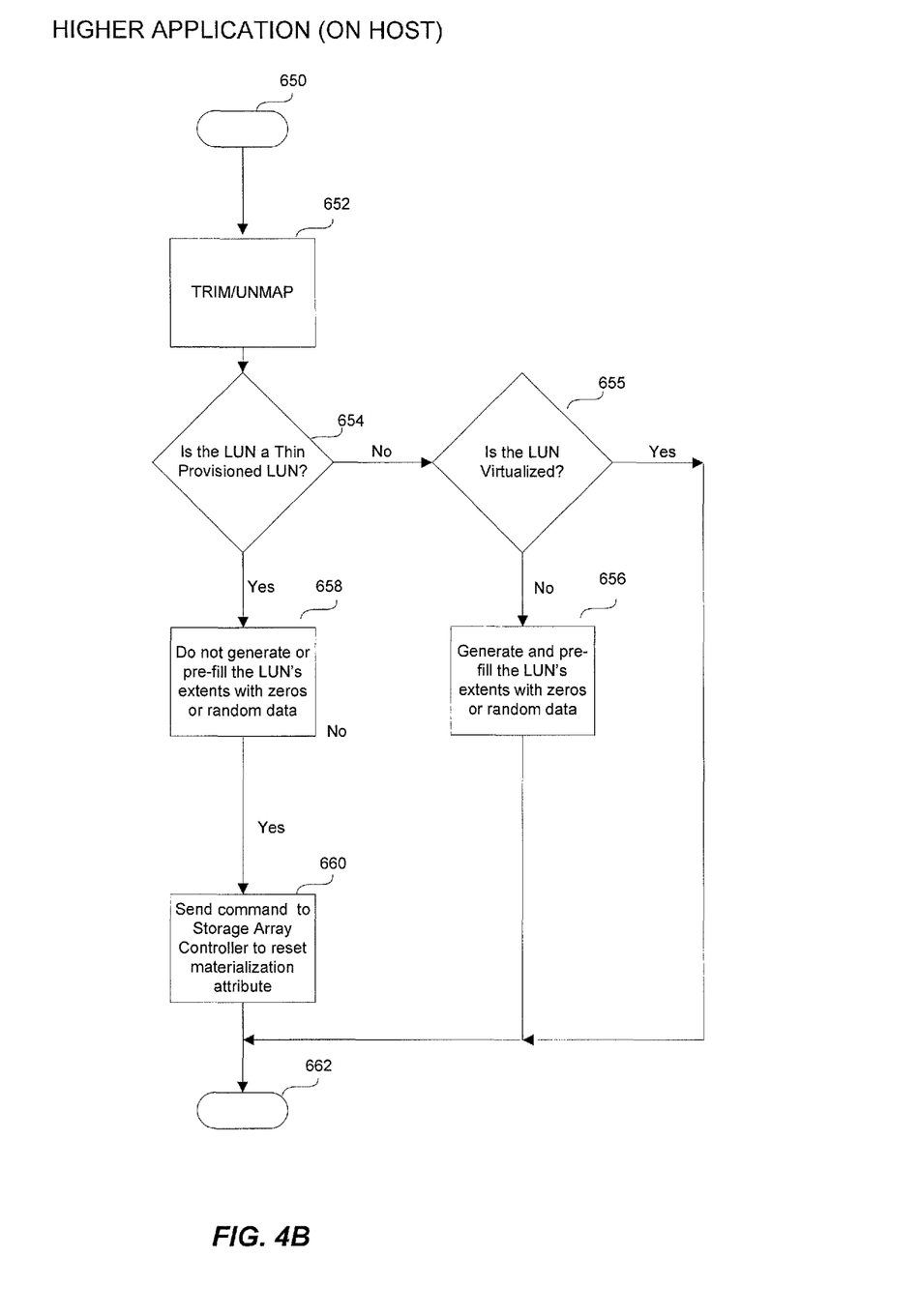
FIG. 4B illustrates a sequence of steps that may be carried out by the higher layer application.

FIG. 4B is a sequence of other steps indicating a different process carried out by the higher layer application 104 executing on host 100. According to another aspect the host 100 can use the thin-provisioning mode information when the extent is no longer needed. Here, in a state 650, a point is reached at which for example, an extent is temporarily released such as from either a TRIM or UNMAP command in state 652. Then, a state 654 is entered where the higher layer application checks if the thin provisioning feature is available. If the storage array controller 220 replies that the feature is not available, then state 655 is entered where the higher layer application checks if the LUN is virtualized. If the LUN is virtualized, the higher layer application is then free to enter a state 662 to perform other tasks and need not wait for the storage array controller to perform any further functions. According to one aspect, the storage array controller may ensure that random data or a zero value is returned for read operations while performing background fill of the LUN extents with random data or zeros. According to another aspect, the storage array controller ensures that a background random data fill value committed to a location of the LUN matches the random data value returned by a corresponding read operation issued prior to a background commit to the location. However, if state 655 is entered and the LUN is not virtualized, then a state 656 is entered in which a higher array application itself will generate and write zeros or random data in the thin provisioned extent before it is released. If however, the thin provisioning is available a state 658 is entered. Here, the higher layer application does not generate and/or fill the LUN's extents with zeros or random data and enters state 660 in which in which a command is sent to the storage array controller 220 to instead reconfigure thin provisioning mode information attributes in the thin provisioning mode page 240. These will include indicating that, for example, 2402 indicates that the corresponding extent is no longer materialized. According to another aspect, the controller, upon receiving a command from the host to release the extent, sets the thin-provisioning mode information used to later determine whether or not to fill the extent with the specific data type, such as upon a next use of the extent. Upon leaving states 656 or 660, the higher layer application enters state 662 in which the host is then free to perform other tasks and need not wait for the storage array controller to perform any further functions.

While this invention has been particularly shown and described with references to example embodiments thereof, it will be understood by those skilled in the art that various changes in form and details may be made therein without departing from the scope of the invention encompassed by the appended claims.

What is claimed is:
1. A storage array controller apparatus comprising:
a host interface to a host processor;
a storage array interface to a physical array; and
a thin-provisioning module communicatively coupled to receive a command over the host interface, the command specifying an extent to be thinly provisioned in the physical array, and the thin-provisioning module setting corresponding thin-provisioning mode information for the extent indicating that the extent is to be filled with a specific data type.

2. The storage array controller apparatus of claim 1 wherein the specific data type specifies random numbers or zero fill.

3. The storage array controller apparatus of claim 1 wherein the thin-provisioning module uses a thin-provisioning mode page to hold the set thin-provisioning mode information.

4. The storage array controller apparatus of claim 1 wherein the thin-provisioning mode information is accessible to the host processor over the host interface.

5. The storage array controller apparatus of claim 1 wherein:
upon a request from the host processor, the storage array controller apparatus responsively materializes the extent in the physical array as indicated by the corresponding thin-provisioning mode information.

6. The storage array controller apparatus of claim 1 wherein the host processor uses the thin-provisioning mode information to avoid further requests to fill the extent with the specific data type.

7. The storage array controller apparatus of claim 1 wherein the host processor uses the thin-provisioning mode information when the extent is no longer needed to avoid filling the extent with the specific data type.

8. The storage array controller apparatus of claim 1 wherein:
upon receiving a command from the host processor to release the extent, the thin-provisioning module sets the thin-provisioning mode information in a manner enabling a later determination of whether or not to fill the extent with the specific data type on a next use of the extent.

9. The storage array controller apparatus of claim 1 further comprising a randomization module.

10. The storage array controller apparatus of claim 9 wherein the randomization module is a hardware random number generator.

11. The storage array controller apparatus of claim 9 wherein the randomization module is a software random number generator.

12. The storage array controller apparatus of claim 1 wherein the thin-provisioning mode information further comprises, for each extent, an indication of: one or more LBAs, whether or not the corresponding LUN is thinly provisioned, whether the specific data type is zero or random, whether or not the extent is materialized, and/or a random number seed.

13. A method for thinly provisioning a storage device, the method comprising:
receiving thin-provisioning mode information for an extent within the storage device, the thin-provisioning mode information for the extent indicating that the extent is to be filled with a specific data type;
setting the thin-provisioning mode information for the extent in a thin-provisioning mode page; and
filling the extent with data values, the data values being based on the specific data type set in the thin-provisioning mode page for the extent.

14. The method of claim 13 further comprising generating random data values.

15. The method of claim 14, wherein filling the extent with data values fills the extent with the random data values generated.

16. A method for releasing a LUN extent, the method comprising:
receiving a command to release the LUN extent in a physical array;
releasing LBA ranges associated with the LUN extent; and
setting thin-provisioning mode information for the LUN extent, the thin-provisioning mode information for the LUN extent being set in a thin-provisioning mode page in a storage array controller and indicating an un-materialized status for the LUN extent after receiving the command to release the LUN extent.

17. The method of claim 16 further comprising generating random data values.

18. The method of claim 17 wherein the LUN extent is filled with the random data values generated based on a specific data type set in the thin-provisioning mode information and based on a next access of the LUN extent, the next access of the LUN extent being an access of the LUN extent occurring after receiving the command to release the LUN extent.

* * * * *